W. P. BRETT.
WINDMILL POWER PLANT.
APPLICATION FILED JAN. 21, 1905.
1,105,021.
Patented July 28, 1914.
3 SHEETS—SHEET 1.
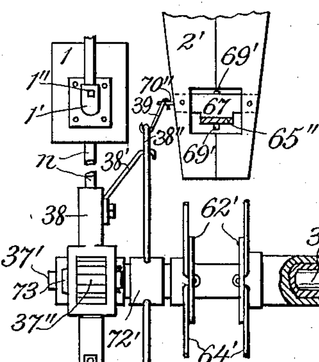
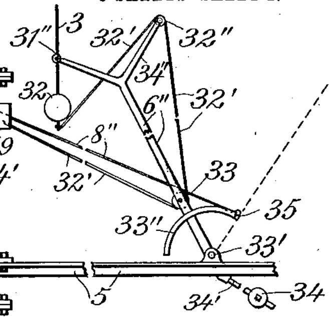
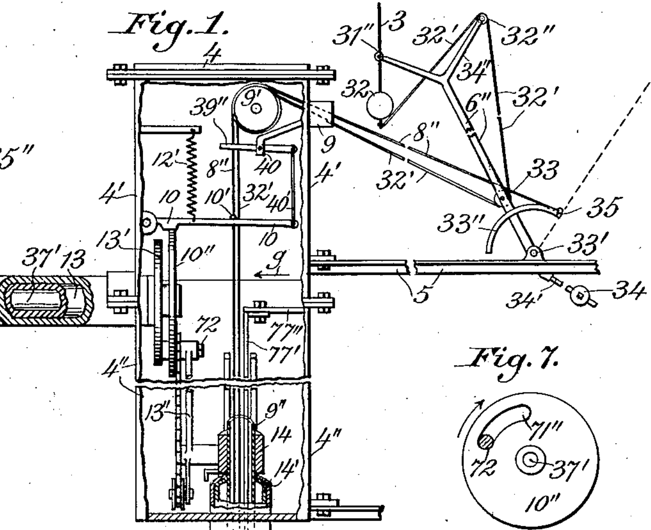
Fig. 1.
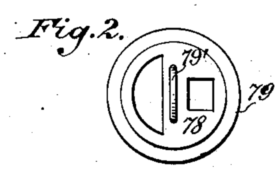
Fig. 7.
Fig. 2.
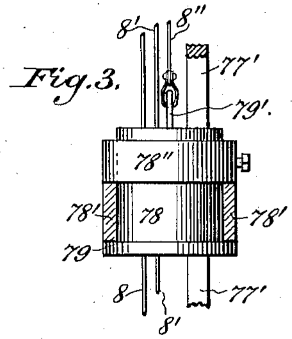
Fig. 3.
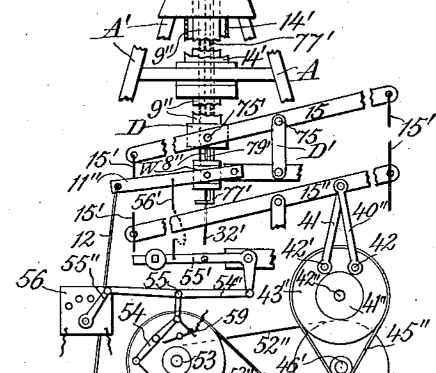
Fig. 8.
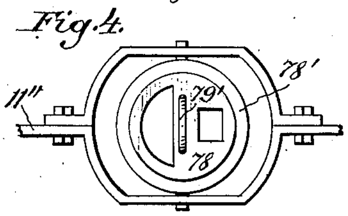
Fig. 4.
Fig. 5.
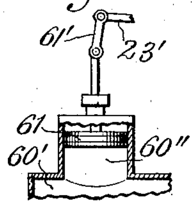
Fig. 6.
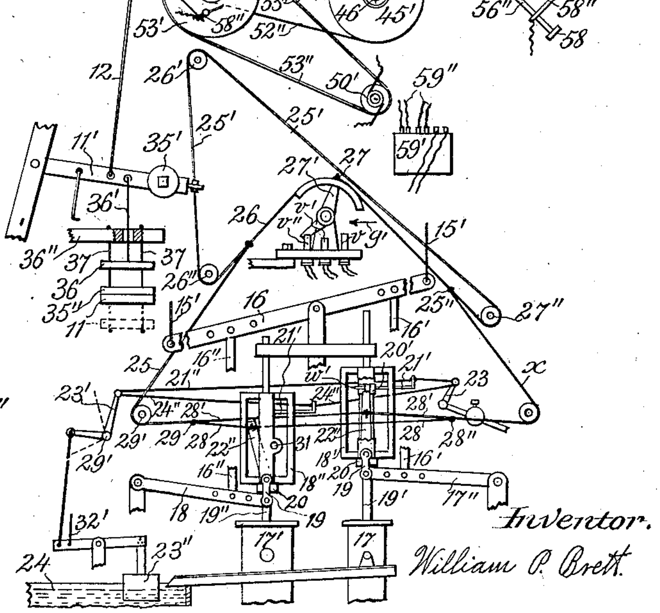
Witnesses:
Rufus Peabody.
James F. White.
Inventor.
William P. Brett.

W. P. BRETT.
WINDMILL POWER PLANT.
APPLICATION FILED JAN. 21, 1905.
1,105,021. Patented July 28, 1914.
3 SHEETS—SHEET 2.
Fig. 9.
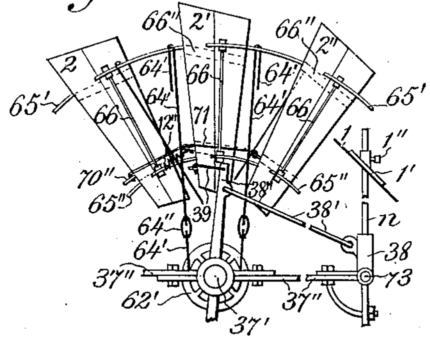
Fig. 10.
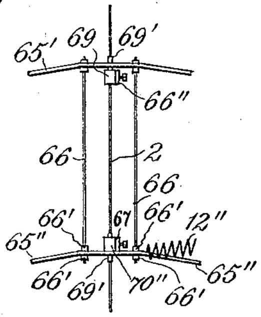
Fig. 11.
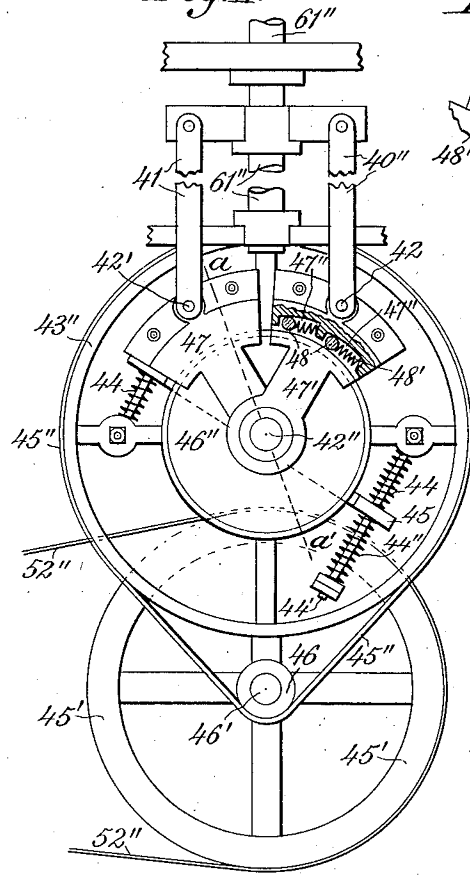
Fig. 12.
40"
42
48"
46"
Fig. 13.
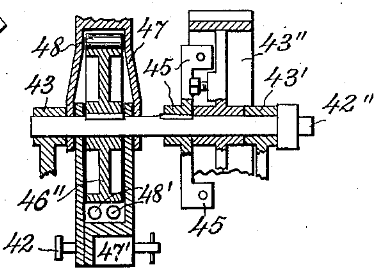
Fig. 14.
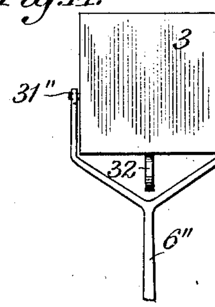
Fig. 15.
3
31"
32'
32"
32
34"
6"
32'
39'
32'
33
33"
8"
35
33'
34'
34
Fig. 16.
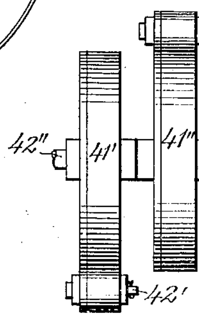
Fig. 17.
40"
42
41"
42"
41
41'
42'
Witnesses:
Rufus Peabody.
James F. White.
Inventor:
William P. Brett.

W. P. BRETT.
WINDMILL POWER PLANT.
APPLICATION FILED JAN. 21, 1905.
1,105,021.
Patented July 28, 1914.
3 SHEETS—SHEET 3.
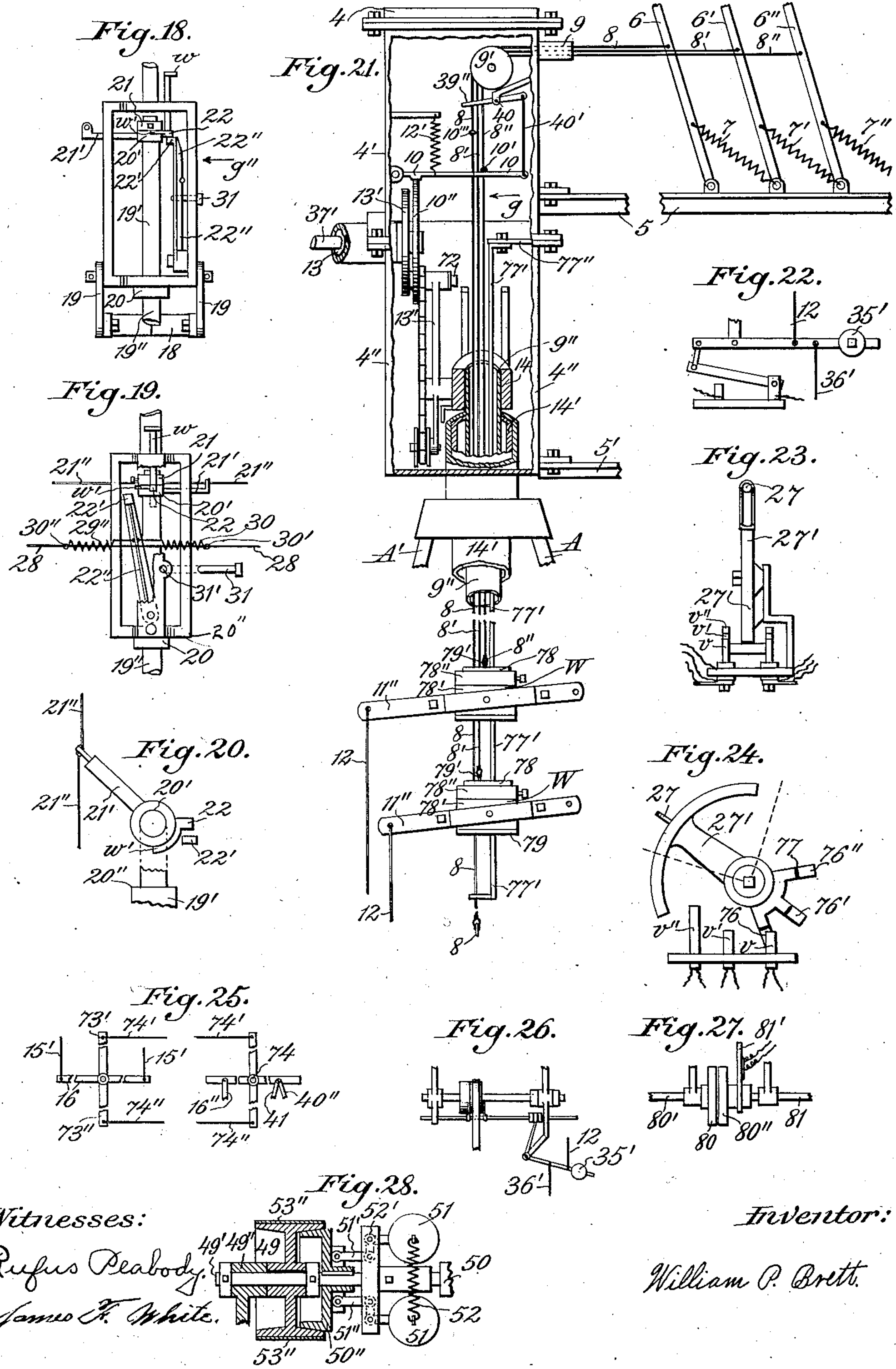
Witnesses:
Rufus Peabody.
James F. White.
Inventor:
William P. Brett.

UNITED STATES PATENT OFFICE.

WILLIAM P. BRETT, OF DECATUR, ILLINOIS.

WINDMILL-POWER PLANT.

1,105,021. Specification of Letters Patent. Patented July 28, 1914.

Application filed January 21, 1905. Serial No. 242,171.

*To all whom it may concern:*

Be it known that I, WILLIAM P. BRETT, a citizen of the United States, residing at Decatur, in the county of Macon and State of Illinois, have invented new and useful Improvements in Windmill-Power Plants, of which the following is a specification.

My invention relates to novel constructions and combinations of windmill parts and other special devices in operative connection therewith whereby the windmill and the devices actuated thereby may be so adjusted as to be automatic in every detail of their operation, covering a range of work that is exacting as to speed regulation and embracing all loads from the lightest to the heaviest that the windmill is capable of carrying, automatically taking up only such load as may be most economically handled by the wind force prevailing at the time, and automatically taking an inactive position when the work to be done is finished or the wind force is not sufficient to carry economically the lightest load with which the windmill may be connected, and the objects of this invention are; first, to provide means whereby a series of power utilizing devices of varying capacities may be automatically operated one or more than one at a time according as the wind force varies, the lighter loads during the lighter winds and the heavier loads during the time of the stronger winds; second, to provide means whereby various devices may be located at different positions either in the upper or lower portions of the windmill tower or at any desired distance therefrom and be actuated by the windmill and be automatically controlled by a controller device which is so positioned as to be responsive to wind forces of substantially the same degree of force as those actuating the windwheel; third, to provide means whereby different machines or groups of devices unlike in their nature and operation may be actuated by the same windmill, each machine or group being automatic in operation and automatically operative independent of the others or in unison therewith; fourth, to provide a windmill power plant whereby the power available in different velocities of wind may be economically utilized in the generation, storage and use of electricity; and fifth, to provide a practical operative combination of parts embodying all of the necessary devices for a complete windmill power plant suitable for automatically supplying substantially all modern conveniences, dependent on power, to isolated residences and villages. I attain these objects by means of the novel details in the construction, arrangement and operation of the several parts of the mechanism which will be apparent from the detailed description hereinafter when read in connection with the accompanying drawings forming part thereof, and wherein only some of the preferable embodiments of the invention are disclosed for the purpose of illustration.

In the drawings Figure 1 is a view of the portions that are essential to show the main features of construction and operative relations of the several parts of a windmill power plant of the character above described; Figs. 2, 3 and 4 are enlarged views of parts of the swivels W and W′, shown in Figs. 1 and 21; Fig. 5, shows two views of one of the weights 11, 35″ or 36 of Fig. 1; Fig. 6 is a view of a piston, cylinder and connecting rod which are adapted in connection with an inclosed tank to automatically stop the pump when the required pressure has been attained; Fig. 7, is a view of the brake wheel 10″ as seen when looking in the direction indicated by the arrow *g* in Fig. 1; Fig. 8, is an enlarged view of the brush controlling device 54 in Fig. 1; Fig. 9, is a front view of the windwheel and governor, parts being broken away; Fig. 10, is an enlarged front view of a portion of the windwheel showing a part of one of the sails standing in its inactive position, and shows the manner in which it is pivoted between the tension or anchor rods 66; Fig. 11, is a side view of a device for converting reciprocating into a substantially regular rotary motion, parts being broken away; Fig. 12, is a view of a modified form of the ratchet portion of the device shown in Fig. 11; Fig. 13, is a sectional view on line *a*—*a*′ of Fig. 11 with the part 47′ swung around so as to be partially shown in section on this line, this figure also shows parts of wheel 43′ and the special devices for driving it; Fig. 14, is a view of the windward side of the sail 3 of the controller device shown in the upper parts of Figs. 1 and 15; Fig. 15, is a side view of the controller device shown in Fig. 1 and is represented as standing in substantially a vertical position; Figs. 16 and 17 are views of another modified form of ratchet mechanism that may be used instead of the corresponding mechanism in Fig. 11; Figs. 18 and 19 are enlarged views of the automatic pump actuating devices 18′ and 18″ shown in the lower portion of Fig. 1; Fig. 20, is a top view of the part 20′ of Figs. 1, 18 and 19 and a side view of a portion of the upper part of the pump plunger shafts 19′ and 19″; Fig. 21, is a view of a windmill head similar to that shown in Fig. 1, in connection with three independent controller devices and means for their practical operation; Fig. 22, is a side view of an automatically operated switch for making or breaking an electric circuit; Fig. 23, is an enlarged view of the multiple switch 27′, in Fig. 1 as seen when looking in the direction indicated by the arrow *g′*; Fig. 24, is an enlarged side view of a modified form of switch lever that may be substituted for the lever 27′ shown in Figs. 1 and 23; Fig. 25, is a miniature view showing how by means of quadrants, reciprocating motion may be transmitted to a great distance with but slight loss of power and converted into rotary motion; Fig. 26, is a side view of a counter shaft and automatic belt shifter; Fig. 27, is a side view of a magnetic clutch; and Fig. 28, is a side view of a friction clutch governor for regulating the speed of a dynamo or other devices.

Similar letters and figures refer to similar and corresponding parts throughout the several views.

The main frame or turntable of the windmill head comprises the incasement parts 4, 4′ and 4″ which are so constructed and united as to form a complete inclosing incasement for the bearings of the main power transmitting members of the windmill head as shown in Figs. 1 and 21, this main frame is secured to the tubular pivot mast 14′ which has vertically separated bearings in the upper part of the tower in which it is adapted to rotate or oscillate about a vertical axis. The power transmitting mechanism of the windmill head comprises the wheel shaft 13, the crank disk 13′, the pitman 13″, the crosshead 14, and the tubular reciprocating shaft 9″ all connected substantially as shown in Figs. 1 and 21. On the shaft 13 the hub portion 62′ of the windwheel is rigidly secured and is adapted to carry the skeleton and sail portion of the wheel substantially as shown in parts in Figs. 1, 9 and 10, in which 64′ are tension spokes secured to the hub 62′ and outer rim 65′; 64″ are turnbuckles for giving tension and rigidity to the spokes and rim; 65″ is an inner rim suspended concentric to the rim 65′ by means of the rods 66 and the adjusting nuts 66′ (see Figs. 9 and 10); 2, 2′ and 2″ are wheel sails provided with the cross bars 66″ and 67 by means of which in connection with pivots 69′ they are pivoted to the rims 65′ and 65″ substantially as shown in Figs. 1 and 10. The wheel is preferably made up of several sections of sails each of which comprises three or more sails, and as each section is a duplicate of the others it is considered necessary to illustrate but one of said sections as shown in Fig. 9, and to simplify the illustration in Fig. 1 there is shown but one sail, the center one of the group of three that are shown in Fig. 9, with the parts connecting the same with the governor of the windwheel. The cross bar 67 of each sail is provided with the clip or projection 70″ (see Fig. 1) which adapts the several sails of each section of the wheel to be connected together by means of links as 71 in Fig. 9 so that when the center sail of the section is oscillated the rest of the sails of the section will oscillate in unison therewith. The governor shaft 37′ extends through the tubular wheel shaft 13 and carries the governor on its outer end and the brake wheel 10″ on its inner end, and with the governor and brake wheel is adapted to rotate with and to oscillate independent of the shaft 13. The brake wheel 10″ is provided with the elongated aperture 71″ through which the wrist-pin 72 is adapted to extend, this slot being of such length as to permit the brake wheel to oscillate independent of the crank disk and windwheel to the extent that when it is at one extreme of its range of action it will cause the governor to hold the wheel sails full in the wind and when at the other extreme it will hold them full out of the wind.

72′ is a hub or central portion of a spider and is so mounted as to rotate therewith and to be capable of oscillation independent of either or both the governor shaft 37′ and the wheel shaft 13, and is provided with as many arms 38″ as there are sail sections in tse windwheel, each of which is connected preferably, with the center of its respective sail section by means of a bar or link as 39. The governor comprises the two oppositely extending arms 37″ which are made rigid with the shaft 37′ and carry at their outer extensions the pivoted parts 38 which carry the extensions *n* upon which are adjustably fixed the governor sails 1, these sails being secured to the casting 1′ which also serve as governor weights.

The wheel sails 2, 2′ and 2″ are normally held full in the wind by means of the springs 12″ (see Figs. 9 and 10) which are connected at one end to the rim 65″ and at the other end to the outer end of the cross bar 67. The connecting parts or links 38′ and 39 are of such length as to hold the part 38 at right angle to the arm 37″ when the sails of the wheel are full in the wind; and the governor sails 1 are so adjusted on the extension *n* as to at all times stand edgewise to the wind and as they revolve in light winds while the wheel sails are full in the wind only an edge is presented to the resistance of the air, but during the time of stronger winds the speed of the wheel is such that the sails 1 and weights 1′ are caused by centrifugal force to overcome the tension of springs 12″, more or less, and to swing outward on the pivots 73 thus presenting the broad side of the sails 1 more or less to the resistance of the air as they revolve at this increased speed and this increased air resistance acting in connection with the momentum and inertia of the governor parts establishes a working condition of the governor that is very sensitive in its responses to variations in wind forces and loads. And by reason of the forward movement of the windwheel the sails 2, 2′, and 2″ will be turned out of the wind or to their inactive positions when the brake wheel 10″ is held against rotation by means of the brake 10; this brake may be set at option and held so permanently if so desired by means of cord 8″ in the construction shown in Fig. 21, and by means of either of the cords 8″ or 32′ in the construction shown in Fig. 1; the securement of either of these cords at the limit of its downward movement will cause the sails of the windwheel to be held in their inactive positions as is more fully described hereinafter.

A preferable means for transmitting the power of the windwheel from high towers is shown in Fig. 1, in which the main parts of the tower are shown as broken away showing only such parts as are necessary to exhibit the attachments of the power transmitting and controlling devices. This main power transmitting mechanism comprises the mechanism of the windmill head describeed above and the walking beams or levers 15, 15″ and 16; the lever 15 is preferably pivoted near the top of the tower to a swinging link D′ which is pivoted at one end to some rigid portion of the tower, and the reeciprocating shaft 9″ is pivoted at its lower end to the lever 15 by means of the vertically apertured trunnioned swivel D. The levers 15″ and 16 may be anchored at any suitable distance below the lever 15 and be actuated thereby by means of the wires or cables 15′ which are pivotally attached to the ends of the several levers and extend vertically from one to the other, and thus constructed and mounted the windmill is adapted to actuate a variety of devices as above outlined and more fully described hereinafter.

In connection with the windwheel, governor, and power transmitting mechanism I provide an automatic controller device shown in operative position in connection with Fig. 1 and detached in Figs. 14 and 15 in which 6″ is a mast pivoted at the point 33′ and is carried by the steering vane bracket 5 of the windmill so that it will always swing on the pivot 33′ in a direction substantially to or from the wind. 33″ is a part made rigid with the mast 6″ near the pivot 33′ and is in the form of an arc of a circle concentric with the pivot 33′ and to which the pull-out or controller cord 8″ is attached at the point 35 from which it is made to extend through the aperture in the part 9 of the incasement, over one of the sheaves 9′ and downwardly through the brake lever 10 and the tubular shaft 9″ and is attached at its lower end to the lug 79′ of the swivel W which through the medium of the lever 11″, cord 12 and lever 11′ is adapted to actuate the weights and devices connected therewith as is more fully described below. By means of the weight 34 and cord 8″ and weight 11 with their connecting parts the mast 6″ is normally held substantially in the position indicated in solid lines in Fig. 1. At the upper part of the mast 6″ is the pivotally mounted weighted sail 3 which is adapted in connection with suitable wind forces to cause the mast 6″ to swing back to the position indicated by the broken line in Fig. 1 and thereby raise lever 11′ for the purpose more fully set forth hereinafter.

In Fig. 21 there is shown a modified form of controller device comprising the three masts 6, 6′, and 6″ to each of which there is attached an independent controller cord either of which may be attached to and caused to automatically control the action of any of the power utilizing devices substantially as described herein below in connection with the controller device described in connection with Fig. 1. In Fig. 1 the cord 8″ is caused to extend through an eye in the brake lever 10 and is provided with the button or enlargement 10′ which is adapted to bear upon the lever 10 and cause it to press heavily upon the brake wheel 10″ when by reason of insufficient wind, to economically operate the windwheel, the weight 11 through the medium of levers 11′ and 11″ and cords or wires 12 and 8″ causes the mast 6″ to take its normal position as shown in solid lines; the eye in the brake lever 10 being sufficiently large to permit the cord to slide freely therethrough so that as the wind increases in force so as to cause the sail 3 to carry the mast 6″ farther back the cord will not raise the lever more than enough to stand clear of the wheel, this lever being normally held clear of the brake wheel by the spring 12′ when there is no force applied to the lower portion of cord 8″ but when the weight 11 is suspended by this cord the brake 10 will be set and the wheel held against rotation, the weight 11 and sail 3 being so proportioned and adjusted that the lightest wind that will economically carry the smallest load to which the windmill is connected will cause the mast to swing to the leeward and draw the cord 8″ causing it to raise the weight 11 and free the brake wheel 10′ when the spring 12″ (see Figs. 9 and 10) will cause the sails of the wheel to take an active position and through the medium of the shaft 13, crank 13′, pitman 13″, crosshead 14 and tubular reciprocating shaft 9″ to actuate the walking beam 15 which is connected at its extremities by small rods or cables 15′ to the extremities of any desired number of similar beams as 15″ and 16 which are provided with suitable means for the attachment of any number of devices that it is desired to have the windmill operate, in this figure the beam 16 by means of the two bars 16′ and 16″ is connected with the levers 17″ and 18 which are each provided with a series of holes corresponding to like series of holes in the beam 16 so that the bars 16′ and 16″ may be so connected as to give any desired stroke to suit the pumps 17 and 17′ which are connected so as to be actuated thereby; the reciprocating ends of levers 17″ and 18 are preferably bifurcated as shown in Fig. 18 and are connected to and adapted to actuate the automatic pump controlling frame or crate devices 18′ and 18″ by means of the links or short connecting bars 19, the pump rods 19′ and 19″ standing between and in line with the links and extending through a vertical aperture in the bottom of the frame and is provided with a rigidly fixed collar 20 against which the bottom of the cage bears to actuate the pump rod on its downward stroke; and the upper portion of the pump rod is provided with the oscillating collar 20′ which is mounted with an easy working fit between the shoulder 20″ (see Fig. 20) of the pump rod and the collar 21, and is adapted to be actuated by means of the arm 21′ and cord 21″ so that the lug or projection 22 (see Figs. 18, 19 and 20) will stand vertically above the end 22′ of the pawl 22″ when said pawl is in a vertical position which is the only position in which it will actuate the pump rod on the upward stroke; the distance between the shoulder 20 and lug 22 is such that when the cage is against the shoulder 20 the end 22′ of pawl 22″ will pass under the lug 22 with a close working fit so that when the lug and pawl are in this position the pump rod will be caused to reciprocate with the cage; the arm 21′ is connected to the cord 21″ intermediate its end portions which may be extended to any desired distance and be attached at one end to a weighted bell crank lever as 23 and at the other end to another bell crank lever 23′ to which is attached a float 23″ which is suitably anchored in a tank as 24 into which the water from the pumps is caused to flow, 23″ being sufficiently buoyant to raise the weight of lever 23 as the water raises in the tank and turn lug 22 so that pawl 22″ will not engage it when the tank is as full as is desired. Automatic actuating cages or devices 18′ and 18″ for actuating pumps 17 and 17′ are substantially duplicates one of the other, and by placing the bell crank levers 23 and 23′ a suitable distance apart two or more pumps of the same or of different sizes may be controlled by the same float and weighted lever whether the pumps reciprocate in unison or not by having a separate cord attached to the arm 21 of each pump controller as 21″ for controller 18′ and 24″ for 18″.

As far as controlling the amount of water in the tank is concerned it may as well be done by means of a stationary part of the cage as by means of the pivoted pawl 22″ as the oscillating collar 20′ is automatically actuated for and accomplishes that purpose, but it is desirable at times to have automatic means for putting into action either a small or large pump or both at a time hence the pawl 22″ which is adapted to be actuated by the cords $x$ and 25 which are attached to the endless cord 25′ at the points 25″ and 26 and the cord 25′ is secured to the end of the lever 11′ between the two sheaves 26′ and 26″ and also to the eye 27 of the segment or multiple switch lever 27′ and passes around the sheave 27″ so that any reciprocating motion of the lever 11′ will cause the cord to oscillate or travel back and forth in its path as outlined by the positions of the sheaves that it is made to encompass, and as the lever 11′ is raised by the action of the wind on the starting and stopping sail 3 as above described it will cause the attaching point 25″ to move toward lever 27′ and impart a like motion to the cord $x$ which is attached to the two cords 28 and 28′ at the point 28″ which pass through the cages 18′ and 18″ and are yieldingly anchored to the pawls 22″ of their respective cages and are united and attached at the point 29 to the cord 25 which extends under sheave 29′ and is attached to cord 25′ at the point 26 as above stated so that the raising of the lever 11′ places the pawls 22″ in position for actuating the pumps 17 and 17′ whenever the windmill goes into action and the pumps will be operated unless the tank is full and the float 23″ has swung the collar 20′ so that the lug 22 stands to one side of the position of the pawl, in which case the pump rods will be pushed to the lower limit of their range of action and the cages will slide freely on the pump rods until the water in the tank is sufficiently low to cause the lug 22 to be moved to the pumping position as above described.

$w$ is a short shaft in cross section of slightly larger dimensions than the upper surface of the lug 22 and is reciprocally mounted in a vertical aperture through the part of the cage that is directly above the lug 22 when it is in position to engage the end of the pawl 22'' for actuating the pump, and $w'$ is a flange on collar 20' the upper surface of which is even with the upper surface of the lug 22 so that it matters not what position the collar 20' is turned to the shaft $w$ will be pushed to its elevated position in the cage as shown in Figs. 18 and 19 when the cage is at the lower limit of its range of action but when the cage is at its upper limit of its range of action the shaft $w$ will fall of its own weight so as to occupy substantially the service position of the lug 22 and extend enough therebelow to arrest the movement of the pawl 22'' should the controller start to move it to service position when the collar 20' is below the level of the upper end of the pawl; and the cords 28 and 28' may be elastic and of sufficient tension to move the pawls 22'' without stretching or they may be non-elastic and be provided with the springs 29'' and 30 (see Fig. 19) which are attached at their adjacent ends to the pawls and at their outer ends to the points 30' and 30'' respectively, the cords, preferably, being encompassed by the springs which are of a very yielding nature so that but very little force is required to cause them to yield. The object of this yielding connection to the pawls is to enable the windmill to automatically operate the small pump during very light winds and the large one or both during the heavy winds; 31 is a removable stop which is adapted to be placed in the aperture 31' as shown in Figs. 1, 18 and 19 and is to arrest the pawl 22'' in its movement causing it to stop in the proper place for actuating the pump, and the attachment of the respective pawls to the cords 28 and 28' is such that the pawl of the small pump will strike the stop 31 at the termination of the first starting motion of the lever 11' which is the result of the action of the sail or starting vane 3 when acted upon by the lightest wind that will economically operate the mill and the small pump, and the pawl for actuating the larger pump will stand in the position shown in Fig. 19 until the wind is sufficiently strong to operate the larger pump or both together as may be desired.

The sail portion 3 of the controller is preferably pivoted at the points 31'' to the upper bifurcated part of the mast 6'' the pivots 31'' being slightly off of the horizontal center line of the sail surface and the weight 32 is attached to the lower part of the sail so as to hold it in a substantially upright position against all moderate wind forces, but permit the sail to turn to the leeward during dangerous storms and 32' is a cord which is attached to the lower extremity of the weight 32 and is made to pass over the sheave 32'' on the arm 34'' of mast 6'' and under sheave 33 near the pivot 33' of the mast whence it follows the cord 8'' down through the mill and tower where the end of it may be loosely secured for hand manipulation or it may be attached to the float 23'' so that the mill as well as the pumps will be put out of action by the float when it is desired to use the windmill for pumping purposes exclusively. Drawing this cord 32' downwardly will turn the sail 3 with the top edge to the windward and while in this position the weights 11 and 35' will set the brake 10 regardless of the wind force prevailing at the time.

The mast 6'' is provided with the grooved segment 33'' to which the cord 8'' is attached at the point 35 so that it is acted upon by a uniform length of lever throughout its range of action, this cord 8'' extends down through the windmill and tower and is adapted to actuate the lever 11' and the pump and other device controlling cords as above described; to the lever 11' is secured the adjustable weight 35' and the cord 36' which has the weight 11 secured to its lower end, the cord 36' passing through the central opening of the weights 35'' and 36 (see Fig. 5) and all of the weights 11, 35'' and 36 are suspended from the bar 36'' by means of the cords 37 substantially as shown in Figs. 1 and 5, the cord 36' being of such length as to permit the weight 11 to descend to the position shown in broken lines when the mast 6'' is drawn to the forward or windward limit of its range of action, at which position the button 10' causes the brake lever 10 to press firmly upon the brake wheel 10'' holding it against rotation to the extent that, through the medium of the shaft 37' and the governor parts 37'', 38, 38' 38'' and 39, the sails of the wheel are turned to their inactive position; with the wheel sails in their inactive position and the lever 11' and weight 11 at the lower limit of their range of action the mast 6'' will stand at an incline to the windward substantially at the angle indicated by the broken line 39' in Fig. 15 and by the solid lines in Fig. 1 and the sail 3 will by reason of the weight 32 and the slackness of the cord 32' maintain a vertical position substantially broadside to the wind when the water tank is not full, and being so proportioned to the weights 35 and 11 that it will remain in that position until there is sufficient force of wind to economically operate the windmill and the lightest load to which it is attached, which in this case is the small pump 17 which is put into action as above described, and when the weight 11 is raised until it rests against the under side of the weight 35″, the next one there-above, the movement of the mast 6″ will be arrested until the force of the wind is sufficient to raise this weight also, this weight being such that the sail 3 will be held in this position until the larger pump may be also economically operated when the further movement of the lever 11′ upwardly will cause the larger pump 17′ to be operated by swinging the pawl 22″ into the vertical position which is accomplished by the controlling cords 28 and 28′ as above described which holds the pawls against the stop pins 31 in both cages, in which case both of the pumps will be in operation at once; when it is desired that only one of the pumps is to be operated at a time the pin 31 is removed from its position in the small pump controller and then the pawl 22″ will be carried past the line of travel of the lug 22 when the larger pump is put into operation, this may be done with economical results when there is not sufficient wind to operate both pumps but enough to operate the larger one, and when the wind force recedes and is not strong enough to operate the larger one the smaller one will be automatically put into operation and will continue in action as long as there is sufficient wind to economically operate it; thus it is seen that by means of a multiplicity of weights any desired number of loads of various sizes may be automatically handled by the one controller mast and substantially all of the available power of the windmill economically utilized up to that developed by the strongest wind in which it may be desired to have the mill operate, and when the danger point is approached the sails of the windwheel will be automatically put into their inactive position and held there until the wind force recedes to a safe stage; this automatic stopping in the dangerous wind velocities being accomplished by the button 10′ striking the lever 39″ which is pivoted at the point 40 and is connected to the brake lever 10 by the bar 40′ which depresses the brake lever and causes the fans or sails of the windwheel to turn edgewise to the wind as above described. The total of the weights to be raised by the cord 8″ being such that the last weight will be raised up against or near the under side of the rigid bar 36″ from which they are suspended when the brake 10 is set and the dangerous wind velocity attained, and after this stage is attained the force of the wind by virtue of the greater sail surface on one side of the pivotal line of sail 3 will cause the sail to turn to the leeward by raising the weight 32 thus partially breaking the wind force acting against this sail in case of a very severe storm, and as the wind recedes the windmill will automatically take up the largest load first and in order the lighter ones until there is not sufficient wind for profitable operation when it will again automatically take its inactive stand. It is also evident that any desired number of machine controlling cords may be attached to the endless cord 25′ and automatically controlled thereby and that such machines may be located at any desired distance from said cord 25′ and be made to operate in rotation as the pumps do and at whatever stage of its operation, upon the receding wind force the mill will be caused to take up the next lighter load and so on down to the stage of wind velocity at which the windmill will go out of action; and it is also evident that a system of walking beams or levers and quadrants like the exhibit in Fig. 25 may be substituted for the cord 25′ and the numerous attachments of other controller cords may be made either to the levers or to the wires or cables connecting them.

When a multiplicity of controller masts are used as 6, 6′ and 6″ as shown in Fig. 21 instead of the one as above described the leeward one should be attached to the lightest load so as to move out of the way of the others and the operation of each will be similar to the operation of the one just described with the exception of the button 10′ which should be supplemented with another button 10‴ which is to be attached to the cord 8 of mast 6 which acts upon lever 39″ to put the wheel out of action in the dangerous winds.

Lever or walking beam 15″ (see Fig. 1) is represented as being pivoted to the tower of the windmill parallel to and intermediate the beams 15 and 16 and is connected at its extremities to the cables or wires 15′ and is actuated thereby and is pivotally connected to the two bars 40″ and 41 which are attached to the two roller ratchet incasements 41′ and 41″ at the points 42 and 42′ on the opposite sides of the longitudinal plane of the shaft 42″ which are shown in the enlarged views in Figs. 16 and 17; in Figs. 11 and 13 this ratchet mechanism is shown as carrying a modified form of ratchet and the shaft 42″ of which is mounted in the bearings 43 and 43′ (see Fig. 13) and carries the pulley 43″, but as shown in Figs. 16 and 17 the ratchet incasements 41′ and 41″ inclose separate ratchet disks which actuate and cause the shaft 42″ to turn with them in one direction but which turn freely on the shaft in the opposite direction and as both are made to actuate the shaft in the same direction and the connecting bars 40″ and 41 having a range of action that is less than one half of a circle described by the pivot points 42 and 42′ the two bars are caused to reciprocate on opposite sides of the shaft 42″ and as both grip so as to actuate the shaft in the same direction one will be impelling the shaft on the downward and the other on the upward stroke thus imparting to the shaft an approximately continuous rotary motion, as the roller ratchet grips at the instant of the reversal of the motion of the bars 40″ and 41 with substantially no lost motion, and to compensate for the slight irregularity in the motion of the shaft 42″ the pulley 43″ is mounted as a loose pulley on the shaft between the carrier 45 and the bearing 43′ and is driven by the spring 44, on rod 44′, which is supplemented by the spring 44″ as a buffer or equalizer with the end 45 of the carrier between the adjacent ends of the springs thus permitting a slight oscillatory motion to the shaft 42″ relative to the motion of the pulley 43″ which is held to a practically uniform motion by means of the momentum of the heavy balance wheel 45′ (see Figs. 1 and 11) which is driven by the strong belt or chain 45″ from the pulley 43″ acting on the small pulley or pinion 46 which is rigidly secured with the balance wheel 45′ on the shaft 46′ thus giving such motion to the wheel 45′ that it and any mechanism that may be driven therefrom will have a substantially regular and uniform motion. The interior of the ratchets 41′ and 41″ will be understood by a reference to the details of the modified forms shown in Figs. 11 and 13 in which 46″ is a disk rigidly secured to the shaft 42″ having a plain circumferential face and is embraced by the two drivers 47 and 47′ which are pivoted on the shaft 42″ at the opposite sides of the disk and have the interior recesses or cavities which have the surfaces 47″ inclined toward the face of the disk 46″ in the direction opposite to which it is intended to rotate, and between this inclined surface and the disk face is a roller as 48 for each of the cavities with springs 48′ abutting against the rollers so as to cause them to impinge between the said incline surfaces and the disk face when the carriers or drivers are moved in the direction carrying the springs before the rollers thus causing the drivers to firmly grip the disk and shaft carrying them together with it, but when the drivers move in the direction carrying the rollers before the springs the springs yield slightly allowing the rollers to move so as not to impinge between the said surface and disk leaving the driver to move freely without carrying the disk with it; in the form shown in these figures the two drivers embrace and actuate the same disk substantially as shown in section in Fig. 13 and in side view in Fig. 11 with portions broken away. In the form shown in Figs. 16 and 17 the drivers are in the form of incasements each entirely inclosing its respective disk which may be entirely surrounded by a number of equally spaced spring actuated rollers; and it is also apparent that by shifting the connecting point of the bars 40″ and 41 nearer to or farther from the fulcrum of the walking beam 15″ that the speed of the shaft 42″ and devices driven thereby may be varied without changing the speed of the windmill. Fig. 12 shows a portion of a modified form of ratchet in which the disk 46″ has ratchet teeth, and a pawl as 48″ is mounted in and carried by the drivers and is adapted to engage said teeth in one direction and to pass over them in the opposite direction. With either of these devices, it is readily seen, that the reciprocating motion of the walking beams may be converted into a substantially uniform and steady rotary motion in the balance wheel 45′ after the wind has increased to the velocity to which the governor of the windwheel is set to act, but prior to the time at which the governor will act the motion of the balance wheel 45′ will fluctuate more or less with the motion of the windwheel and to economically utilize this fluctuating motion in the generation of electricity or in other uses exacting in speed regulation, I provide an independent clutch governor as illustrated in Fig. 28 in which 49 is a loose pulley on shaft 49′ which is mounted in bearings 49″ and 50 and may be either an extension of the armature shaft of a dynamo or a part of a counter or line shaft as conditions may require, but in this specification will consider it an extension of the armature shaft of the small dynamo 50′ in Fig. 1; 50″ is a cone clutch member axially slidable on the shaft 49′ and adapted to carry the shaft with it in its rotation, and by means of the centrifugal force of the governor weights 51 is adapted through the medium of links 51′ and 51″ and suitable connections to be drawn from its engagement with the loose pulley 49 with which it is normally engaged by means of the governor springs 52 which draw the weights toward the center of the shaft to which their carrier 52′ is rigidly secured so that the cone surface of the member 50″ engages the corresponding surfaces of the pulley 49, the tension of the springs 52 being such that the weights will respond to their centrifugal force only when the proper speed for the dynamo has been attained, at which speed they cause the disengagement of the clutch members and prevent the shaft 49′ being driven at a higher rate regardless of the speed of the pulley 49.

Referring again to the device for converting reciprocating into rotary motion in Fig. 1 the belt 52″ is actuated by the balance wheel 45′ and drives the armature shaft of the large dynamo 53 which carries the large pulley 53′ which by means of the belt 53″ drives the small dynamo 50′ through the medium of the clutch governor above described and shown in Fig. 28; the large dynamo 53 is provided with a special automatic brush controlling device, shown on an enlarged scale in Fig. 8 in which 54 is a lever pivoted at the point 54′ and is adapted to be oscillated by the bar 54″ which is pivoted to the lever end 55 and is pivotally connected to one arm of the bell crank lever 55′ (see Fig. 1) which is adapted to be actuated by the controller mast 6″ through the medium of the lever 11″ and cord 56′, this cord 56′ being slack enough not to actuate the lever 55′ until the proper wind force prevails, the lever 55′ is also shown as connected to the arm or lever 55″ of the rheostat or automatic controller 56 which may be economically employed in various ways in starting small motors that may be located at a distance from the generating plant. By following the line of connection from the walking beam 15″ it is seen that the small dynamo 50′ will start as soon as the windmill does and it is designed to be economically operated by the lightest wind that the controller will permit it to be actuated by when the windmill operates a generating plant alone, and as the wind increases in force or fluctuates the speed of the armature is controlled by the clutch governor above described and shown in Fig. 28. This governor dynamo is designed to utilize the lighter wind forces that frequently prevail for considerable periods of time when there is not sufficient force to cause the windwheel governor to act, as it is very wasteful of power to hold the speed of the wheel down to such velocities only as may be attained in the lighter winds, and the small dynamo can furnish sufficient current for light service of various kinds; the lever 54 of the brush controller for the large dynamo is provided with the two bars 56″ and 57 which are pivotally connected therewith and are slidably mounted in apertures through the brush holders 57′ and 57″ and are provided with the shoulder portions 58 and 58′ which normally bear against the arms 58″ and 59 and hold the brushes clear of the armature as shown in Fig. 1, thus relieving the armature shaft of all resistance so that it may be economically utilized as a counter shaft from which the small dynamo is driven and the connections to the controller devices are so adjusted that when there is sufficient wind force to economically operate the large dynamo the automatic controlling mechanism will be actuated as above described causing the lever 54 to take the position shown in Fig. 8 and the brushes to bear upon the commutator thus automatically putting the larger dynamo into service.

59′ in Fig. 1 represents a storage battery which is designed to be in automatic connection with the generators so that when it is fully charged it will be automatically cut out or disconnected by a magnetic switch or other means similar to the switches above described and 59″ are terminals of circuits for electric lights or other purposes, and in Fig. 22 is shown a means by which an ordinary switch may be automatically actuated so as to make or break the circuit connected with a magnetic clutch or other electrically operated devices for actuating or controlling machinery, and Fig. 23 shows one view of a multiple switch a view of which is shown in Fig. 1 with the eye 27 of the lever 27′ secured to the endless cord 25′ so that it is actuated by said cord in its operation as above described. In this switch three sets of terminals are shown *v*, *v*′ and *v*″ of which *v* is the terminals of the circuit carrying the lightest load and which will be closed by the first movement of the controller when the mill is put into action, and the weights 11, 35″ and 36 are so spaced that each step in the movements of the controlling apparatus will terminate with the lower portion of the lever 27′ in contact with the terminals of the circuit or load corresponding to the prevailing wind force; Fig. 24 is a view of a modified form of the multiple switch lever 27′ in which the lever is provided with three contact parts 76, 76′ and 76″ that are so spaced as to register with the terminals *v*, *v*′ and *v*″ and these contact parts are insulated one from the other as shown at 77 in the part 76″ so that three different and independent circuits may be controlled by one switch and so manipulated automatically that either one, two or all three may be put in service at a time according as wind and work conditions determine, thus it is seen that the cord 25′ may be connected with a great variety of devices that may be so apportioned and adjusted as to utilize substantially all of the power available working the wheel with the sails substantially full in the wind whether the wind be heavy or light.

Fig. 26 is a view of a counter shaft with tight and loose pulleys and a belt shifter which is adapted to be actuated by either of the controller cords described above as conditions may warrant.

Fig. 5 shows two views of one of the weights 11, 35″ or 36 which are so constructed that they may be put in place or removed without disconnecting the supporting cords 37 which are provided with the knots or buttons 60 which are adapted to enter the recesses on the under side of the plates so as to support them apart as shown. These cords may be of any desired length and provided with as many buttons as the nature of the work will require, and by having a variety of sizes of plates it is seen that any contingency that may be confronted in the way of load variation may be met successfully without having to climb to the top of the tower to adjust the controller mechanism.

Fig. 6 represents a part of a closed tank or reservoir into which water or compressed air may be forced by substituting a suitable pump for one of the pumps 17 or 17′ and 60″ is a cylinder in communication therewith having the close fitting piston 61 which is adapted by means of the piston rod to actuate the bar 61′ which is designed to extend to and to connect with the lever 23′, in slightly modified form, shown in Fig. 1 when the closed tank is used instead of the open one, so that when the desired pressure in the tank is attained it will actuate the pump controllers as above described, and by having a separate set of levers as 23 and 23′ for each pump all of the pumps may be automatically controlled whether they pump into the same tank or not.

Figs. 2, 3 and 4 are enlarged views illustrating the construction and functions of the different parts of the swivels W and W′ for the cords 8 and 8′, in which 77′ is a square shaft that is rigidly fixed to the bracket 77″ in the upper part of the incasement of the windmill head (see Fig. 21) so as to stand clear of the crosshead 14 and tubular shaft 9″ when they are at the upper limit of their range of action and is designed to extend down through said tubular shaft 9″ and sufficient distance therebelow to accommodate as many swivels as may be needed for the cords to be used in the windmill, in this specification only two special swivels are needed as the cord 8 does not need a vertically apertured swivel as an ordinary swivel link will always answer for one cord. In this special swivel the part 78 is a flanged sleeve having two vertical apertures therethrough one of which is square and adapted to an easy sliding fit on the square shaft 77′ and the other is to accommodate the passage of one or more cords through the swivel, and the sleeve portion is adapted to an easy rotatable working fit in the trunnioned collar 78′ which is mounted between the flange 79 and the removable collar 78″ and is embraced by the lever 11″ which engages the trunnions of the collar, and the sleeve is provided with the apertured lug 79′ to which the cord of each swivel is attached so that as the windmill head turns about its axis the shaft 77′ will cause the sleeve of each swivel to turn therewith so that all of the cords above their swivel attachments will rotate therewith and prevent any entanglement thereof.

Fig. 27 is a view of a magnetic clutch with the part or member 80 carried on the live or driving part of the shaft 80′ and the driven member or part 80″ rigidly fixed on the driven shaft 81, the member 80″ having a hub portion that is adapted to rotate in contact with the nonrotatable member 81′ which carries the terminals of the electric circuit for operating the clutch, which circuit may be closed or opened automatically by either of the switches shown in Figs. 22, 23 and 24.

In Fig. 25 the lever or walking beam 16 of Fig. 1 is represented as having the arms 73′ and 73″ which are adapted to actuate a quadrant as 74 by means of the cables or wires 74′ and 74″ and the quadrant 74 may be placed at any desired distance from the windmill and be made to actuate either reciprocating or rotating devices the same as are shown in connection with the beams 15″ and 16 in Fig. 1.

It is also observed that by placing the beam 15 near the top of the tower and making it so that the distance from the pivot 75 to the points where the cables 15′ are attached is four times the distance from the pivot 75 to the point where the reciprocating shaft 9″ is attached, the working strains on the part of the tower below where 15 is anchored will be only one fourth of what it is on the part above that point thus making it not necessary to provide for these heavy working strains throughout the greater portion of the tower, and also that by such apparatus the friction of the many bearings of the usual vertical shaft is avoided.

Thus a windmill of the character described above and mounted upon a tower of any desired height is adapted, in connection with the other apparatus as shown therewith, to furnish suitable power to supply all modern conveniences, that are dependent upon power, to isolated residences and villages.

What I claim as new and desire to secure by Letters Patent is—

1. The combination in a windmill power plant of a windwheel comprising sails adapted to active and inactive positions, mechanism for putting said sails into and out of their active positions, a controller comprising a reciprocating sail, connecting devices whereby a predetermined starting force of the wind acting against said reciprocating sail will cause said mechanism to put said windwheel sails into their active positions and whereby a predetermined increase above the said starting force of the wind will cause the said windwheel sails to be put into and held in their inactive positions while said increased force of wind prevails.

2. The combination in a windmill power plant of a windwheel comprising sails adapted to active and inactive positions, mechanism for putting the said windwheel sails into and out of their active positions, a device or cord adapted to reciprocal movement, a weight and suitable connecting parts supported by said device or cord and adapted to normally cause said sails to stand in their inactive positions, a wind actuated controller, and means whereby a predetermined force or velocity of wind will cause said controller to raise and hold said weight in its elevated position for the purpose set forth.

3. In combination a wind wheel, mechanism for putting the sails of said windwheel into and out of their active positions, a part or pull out device comprising a portion of said mechanism and adapted, throughout the greater part of its range of action, to operate independent of the wheel connected parts of said mechanism, a series of weights spaced apart one above the other and normally supported independent of said device, and means connected with said device whereby predetermined forces or velocities of wind will cause it to elevate and support one, any number or all of said weights, for the purpose set forth.

4. The combination in a windmill power plant of a wind wheel with sails adapted to active and inactive positions, a wind actuated controller device, means whereby predetermined wind forces acting on said device and windwheel will cause the movement of said wheel sails to be effected from active to inactive and inactive to active positions respectively, an oscillating sail portion comprising a part, and carried by other moving parts, of said device, and means whereby the said sail portion may be turned to or from the wind independent of the movements of the said other moving parts.

5. The combination in a windmill power plant of a windwheel having sails adapted to active and inactive positions, a controller device responsive to predetermined wind forces and adapted to cause the movement of said sails to or from their active and inactive positions, means adapted, normally, to cause the said windwheel sails to be held in their inactive positions, and means whereby parts of said controller device may be optionally operated from a distant position.

6. The combination in a windmill power plant of a main frame or turntable adapted to operate about a vertical axis, a windwheel carried by said turntable and comprising sails which are adapted to active and inactive positions, a controller device also carried by said turntable and adapted to be automatically actuated by the force of the wind, means adapting said controller device to normally cause the said windwheel sails to be held in their inactive position, and means whereby predetermined wind forces will cause the said controller device to cause the turning of said windwheel sails to either active or inactive positions respectively.

7. The combination in a windmill power plant of a windwheel having sails adapted to active and inactive positions, a controller device responsive to predetermined wind forces, and means whereby said controller device is, normally, adapted to cause said windwheel sails to be turned to and held in their inactive position.

8. In combination a brake or friction portion, a brake lever, another lever spaced a suitable distance from and adapted to actuate said brake lever, and a pull out cord adapted at the limit of its movement in one direction to set said brake lever and hold said portion against rotation and at the first part of its movement in the opposite direction to release said portion until the opposite limit of its range of action is approached when it will cause said other lever to set said brake lever for the purpose set forth.

9. In combination a friction or brake portion, a brake lever adapted to hold said portion against rotation, and a pull out device adapted at the extreme limits of its range of action to cause said lever to hold said portion against rotation and to actuate said lever only at the near approach to said limits.

10. The combination in a windmill power plant of a wind wheel having sails adapted to active and inactive positions, a brake portion adapted to rotate with said windwheel and to oscillate independent thereof, means adapted to normally hold said sails in their active position and cause said brake portion to rotate with said windwheel, a brake adapted to hold said portion against rotation, and a pull-out device adapted at either limit of its range of action to set said brake on said brake portion for the purpose set forth.

11. In combination a friction or brake portion, a brake adapted to hold said portion against rotation, a pull out device adapted at the approach to either limit of its range of action to set said brake, a weight adapted to actuate said device in one direction, and a sail portion with suitable connections whereby a predetermined wind force will actuate said device in the other direction.

12. In combination a brake portion, a brake adapted to retard or hold said portion against rotation, a controller device adapted to normally set said brake at one limit of its range of action, a sail portion and suitable connections whereby predetermined velocities or wind forces will cause said device to move through the respective stages of its range of action to the opposite limit thereof, and a series of weights adapted to be successively raised by said device as it is moved from one limit of its range of action to the other by said wind forces.

13. In combination a friction or brake portion, a brake adapted to retard the movement of or hold said portion against rotation, and a controller device adapted to set said brake at the limit of its range of action and to be actuated in one direction by a series of weights and in the other direction by the force of the wind.

14. In combination a windwheel, a series of loads or power utilizing devices, a series of weights, and a controller device mounted in operative relation to said windwheel and loads and adapted to be actuated in one direction by said series of weights and in the other direction by the force of the wind whereby said windwheel is caused to be automatically connected to or disconnected from one or more of said loads according as the variations of the wind velocities demand, for the purpose set forth.

15. In combination a windwheel, a series of different sized loads or power utilizing devices, power transmitting mechanism whereby said windwheel is adapted to actuate said devices, and an automatic controller whereby said windwheel may be held inactive and whereby said loads may be automatically connected and disconnected in order ranging from the lightest to the heaviest during the operation of said windwheel.

16. In combination a tower, a main frame or turntable provided with a pivot portion by means of which it is adapted to rotate or oscillate about a vertical axis at the top of said tower, a windwheel carried by said turntable, a governor or speed regulator for said windwheel, a power utilizing device stationed below said pivot portion, a controller device carried by said turntable, means for transmitting power from said windwheel to said power utilizing device, a plurality of controller cords operatively mounted and adapted to effect or vary the action of said governor, controller device and power utilizing device, and means for preventing the entanglement of said cords during the operation of said devices and turntable.

17. In combination a tower or supporting frame, a windwheel operatively mounted at the upper portion of said tower or frame, a controller device extending from the upper to the lower portions of said tower and comprising a sail at the upper and a pivoted lever at the lower portion thereof, a multiplicity of sheaves adapted to carry an endless flexible member or cord, the said member or cord adapted to be actuated by said lever, and means whereby a multiplicity of other controller devices may be attached to said member.

18. In combination a windwheel, power transmitting mechanism adapting said windwheel to actuate a machine at a distance therefrom, controlling mechanism for said windwheel, a controller for said machine, and a main controller device comprising a sail portion and adapted in connection with predetermined wind forces to actuate said windwheel controlling mechanism and said machine controller.

19. In combination a windwheel, controlling mechanism for said windwheel comprising a pivoted mast and a sail portion pivoted near the free end of said mast, means whereby mechanism, at a distance therefrom, may be actuated by said windwheel, an automatic stop device for said distant mechanism, and a cord with suitable connections extending from said stop device to said sail portion, for the purpose set forth.

20. In combination a windwheel, a controller mechanism for said windwheel comprising a sail portion which is reciprocally responsive to predetermined wind forces, a governor or speed regulator for said wheel adapted to operate independent of but during predetermined wind forces to be controlled by the said controller mechanism, steering mechanism for said windwheel adapted to operate independent of the action of said sail portion, a tank, pumping mechanism, means whereby said windwheel may be caused to actuate said pumping mechanism, an automatic device for limiting the contents of said tank, and connecting parts whereby said device will cause said sail portion to be turned to and from the wind independent of the movements of the said governor and steering mechanism.

21. In combination a windwheel having sails adapted to active and inactive positions, controlling mechanism for said windwheel, pumping mechanism, means whereby said windwheel may be caused to actuate said pumping mechanism, a tank adapted to receive the discharge from said pumping mechanism, a controller device mounted apart from said windwheel and comprising a pivotally mounted sail portion, a float, and means in connection with said float and sail portion whereby the filling of said tank will cause said sail portion to turn edgewise to the wind, for the purpose set forth.

22. The combination in a windmill power plant of a windwheel, a speed regulator for said windwheel, a main controller adapted to service independent of the movements of said wheel and regulator, a power utilizing device adapted to be actuated by the said windwheel, and means whereby the force of the wind may cause the said main controller to effect the actuation or nonactuation of said power utilizing device independent of the movements of said windwheel and speed regulator.

23. In combination a windwheel, an automatic controller device comprising a sail portion, pumping mechanism comprising a reciprocating shaft or pump rod, a reciprocating frame or cage slidably mounted upon said rod, means whereby said windwheel is adapted to actuate said frame or cage, a pump actuating pawl carried by said cage, and means in operative connection with said pawl and sail portion whereby predetermined wind forces will cause said pawl to stand in actuating and nonactuating positions respectively, for the purpose set forth.

24. In combination a windwheel, an automatic controller device comprising a sail portion, pumping mechanism comprising a reciprocating shaft, a reciprocating frame or cage slidably mounted upon said shaft, means whereby said windwheel is adapted to actuate said cage, a pump actuating device carried by said cage, a tank adapted to receive the discharge from said pumping mechanism, a tank controller device, and independent connecting parts extending from said actuating device to said sail portion and said tank controller device.

25. In combination a reciprocating shaft, a frame or cage slidably mounted upon said shaft, a fixed collar on said shaft below said cage, an actuating pawl carried by said cage, and an oscillating collar comprising a lug and an arm, substantially as and for the purpose set forth.

26. In combination a shaft adapted to be reciprocally actuated, a cage or frame slidably mounted upon said shaft, a shaft actuating part carried by said cage or frame, an oscillating collar longitudinally fixed upon said shaft, and automatic means for actuating said collar whereby it is made to stand in an actuating or a nonactuating position relative to said actuating part.

27. In combination a shaft adapted to be reciprocally actuated, a frame or cage slidably mounted upon said shaft, the pawl 22′, the collar 20′, and the stop pin *w*.

28. In combination a windwheel, a walking beam adapted to be actuated by said windwheel, pivoted pumping levers, pumps adapted to be actuated by said levers, a series of apertures in said levers and corresponding apertures in said beam, connecting bars adapted to a pivoted engagement with the corresponding apertures of said levers and beam, pump controller devices as parts connecting said levers and pumps, and automatic means whereby said devices may be so actuated as to operate said pumps singly, unitedly or not at all during the operation of said walking beam.

29. The combination in a windmill power plant of a windwheel, a plurality of power utilizing devices adapted to be actuated by said windwheel, an individual controller device for each of said power utilizing devices, automatic means responsive to the force of the wind for effecting, through the medium of said individual controller devices, the actuation or non-actuation of any one or any number of said power utilizing devices, other automatic means responsive to the work done or out-put of said power utilizing devices whereby through the medium of parts of the said individual controller devices the nonactuation of any one or any number of said power utilizing devices may be effected independent of the action of the said first named automatic means.

30. In combination a tower or frame, a windwheel mounted at the upper portion of said tower, a series of walking beams arranged one above the other below said wheel and adapted to be actuated thereby, a multiplicity of rotating and reciprocating machines adapted to be actuated by said beams, a main controller device comprising a sail portion, an individual controller device for each of said machines, and means whereby said main controller device will automatically so manipulate said individual devices as to cause such of said machines to be in operation as will be most economically operated by the wind force prevailing at the time.

31. In combination a tower or supporting frame, a windwheel mounted upon said frame, a multiplicity of machines stationed at various distances from said windwheel and adapted to be actuated thereby, a controller for each of said machines, a main controller comprising a sail portion mounted at the upper portion of said tower, and means in operative connection with said main controller whereby said machine controllers will be so manipulated automatically as to cause such one or such group of said machines to be operated as will most economically utilize the wind force prevailing at the time of their operation.

32. In combination a tower, a main frame or turntable carrying a windwheel and mounted at the upper portion of said tower, a walking beam pivoted in the upper portion of said tower below said turntable, another walking beam pivoted at the lower portion of said tower, cables or wires connecting the corresponding end portions of said beams, a vertical aperture through said upper beam vertically below the center of the pivot portion of said turntable, a tubular reciprocating shaft adapted to be actuated by said windwheel and operatively connected to said upper walking beam, and means extending through the apertures of said shaft and beam for controlling said windwheel.

33. In combination a tower or supporting frame, a turntable adapted to rotate or oscillate about a vertical axis at the upper portion of said tower, a windwheel, a controller device adapted to rotate or oscillate with said turntable, a pivoted or feathering sail portion for said device, means whereby machines at the lower portion of said tower may be actuated by said windwheel, and means whereby said controller device may automatically start and stop said machines independent of and during the operation of said windwheel.

34. In combination a tower or supporting frame, a windwheel and a controller device operatively mounted at the upper portion of said tower or frame, means by which an operator at the lower portion of said tower may at option put said windwheel into or out of action, means whereby machines at the lower portion of said tower or frame may be operated by said windwheel, and means whereby said controller device may automatically start and stop said machines independent of and during the operation of said windwheel.

35. The combination in a windmill power plant of a windwheel, controlling mechanism adapted, normally, to hold said windwheel out of action, a main controller part responsive to the force of the wind and so mounted as to be affected by wind forces approximately the same in degree of force as those by which the said windwheel is actuated, and means whereby predetermined wind forces acting on said main controller and windwheel will automatically cause the actuation or nonactuation of the said windwheel according to the respective predetermined wind forces.

36. The combination in a windmill power plant of a tower, a turntable at the top of said tower, a wind actuated controller part, a pivoted mast carried by said turntable and adapted to be moved in one direction by the force of the wind acting on the said controller part, and means whereby a variable counteracting force is applied tending to move said mast in the opposite direction to that to which it is moved by said controller part whereby said mast is caused to move through its range of action by intermittent stages at the termination of each of which the said mast may remain stationary until a predetermined increase or decrease of wind force against said controller part will cause said mast to move in its respective direction therefrom.

37. The combination in a windmill power plant of a tower, a turntable, a windwheel, an oscillatory lever or mast, a sail carried by said lever or mast and adapted in connection with the force of the wind to cause the movement of said lever through its full range of action in one direction, means for moving said lever through its full range of action in the opposite direction to which it is moved by the force of the wind said means being adapted to cause the said lever to pass through its range of action by partial movements making stops at a plurality of predetermined points as it travels in either direction, mechanism adapted to offer a variable resistance or load to its impelling power and adapted to be actuated by the said windwheel, and means whereby the respective resistances or loads of said mechanism will be carried by said windwheel as said lever stands at the termination of its respective partial movements through its said range of action.

38. In combination a tower, a main frame or turntable mounted to rotate or oscillate about a vertical axis at the top of said tower, a windwheel carried by said main frame, walking beams at the upper and lower portions of said tower, strained parts in operative connection therewith and extending from one to the other of said beams, means whereby said windwheel is adapted to reciprocally actuate said beams during its rotation or oscillation about said vertical axis, a plurality of machines at the lower portion of said tower which are adapted to be actuated by said beams, and means in operative connection therewith whereby said machines and windwheel may be automatically controlled each independent of the other.

39. In combination a tower, a windwheel and a controller device mounted at the upper portion of said tower, means whereby said windwheel is adapted to actuate a machine located at a distance therefrom, means whereby said controller device, in response to and acting in conjunction with certain predetermined wind forces, will cause said windwheel to go into or out of action, and means whereby said machine may be automatically put into or out of action by the said controller device during and independent of the operation of the said windwheel.

40. The combination in a windmill power plant of a tower, a main frame or turntable adapted to operate about a vertical axis at the top of said tower, a windwheel, a main controller carried by said turntable and mounted independent of said windwheel, a plurality of power utilizing devices adapted to be actuated by said windwheel, an individual controller part for each of said power utilizing devices, an intermediate controller mechanism in operative connection with said main controller and all of said individual controllers, and a work or out put controller for each of the said power utilizing devices which are adapted to control the operation of their respective devices independent of the action of the said main and intermediate controllers during the operation of said windwheel.

41. The combination in a windmill power plant of a controller part responsive to variations in the force of the wind, a device located at a distance from said controller part and adapted to actuate a plurality of other controller mechanisms, and means whereby said controller part will automatically cause said device to actuate said other controller mechanism in accord with the variations in the force of the wind.

42. The combination in a windmill power plant of a windwheel, a plurality of power utilizing machines, an individual controller for each of said machines, a device adapted to manipulate said individual controllers, a controller part responsive to variations in the force of the wind, and means in operative connection with said controller part whereby said device may be automatically caused to so manipulate said individual controllers as to utilize but one any number or all of said power utilizing machines according to variations in the force of the wind.

43. In combination a wind actuated controller part adapted to be moved in one direction by the force of the wind and having means tending to move it in the other direction, an endless cord or belt operatively mounted, another cord or belt mounted with its end portions secured to said endless cord, and means in operative connection with said controller part whereby irregular wind forces will automatically impart a reciprocating motion to said cords or belts.

44. The combination in a windmill power plant of a windwheel, a wind actuated controller part having a fixed range of action, and means in connection with said controller part whereby it is caused to hold said windwheel against rotation at either limit of its range of action.

45. The combination in a windmill power plant of a windwheel, a governor for said windwheel, a plurality of power utilizing devices, means whereby said devices are adapted to be actuated by said windwheel, a controller device having a fixed range of action and being responsive to predetermined variations in the force of the wind and adapted to operate independent of said governor except at the near approach to the limits of said range of action, and means whereby said controller device is adapted to automatically cause the alternate operation of said power utilizing devices during the operation of said windwheel.

46. The combination in a windmill power plant of a windwheel, a main controller responsive to the variations in the force of the wind and mounted independent of said windwheel, a plurality of power utilizing devices adapted to be actuated by said windwheel, an individual controller part for each of said power utilizing devices, an intermediate controller mechanism in operative connection with said main controller and all of the said individual controller parts, a work or output controller for each of the said power utilizing devices, and means whereby the said work or out-put controllers may automatically cause the said individual controller parts to be put either into or out of operating connection with their respective power utilizing devices independent of the movement of the said main controller and intermediate controller mechanism during the operation of said windwheel.

47. The combination in a windmill power plant of a windwheel, speed regulating mechanism for said windwheel, a plurality of power utilizing devices, means whereby said windwheel is adapted to actuate said devices, an individual controller for each of said power utilizing devices, a main controller responsive to predetermined wind forces, and means whereby said main controller is adapted to automatically cause said individual controllers to put their respective power utilizing devices either into or out of service during the operation of said windwheel and speed regulating mechanism.

48. In combination a windwheel having a plurality of pivoted sail portions whose range of impelling service position is from a position full in the wind to a position near where they are completely out of the wind, a governor adapted to automatically vary the action of said sail portions throughout said range of impelling service position during the rotation of said windwheel, and a wind actuated controller device having a limited range of action and adapted at its near approach to either limit of said range of action to automatically cause said governor to turn said sail portions to their inactive positions.

49. In combination a windwheel having a plurality of pivotally mounted sails, a governor adapted to cause the oscillation of said sails on their pivots during the rotation of said windwheel, and a controller device having a reciprocal movement and adapted at either limit of its range of action to hold said governor and windwheel inactive.

50. In combination a windwheel provided with impact surfaces which are adapted to be so actuated automatically that they may all simultaneously operate full in the wind, a plurality of power utilizing devices of different capacities, means whereby said devices are adapted to be actuated by said windwheel, a controller device responsive to the variations in the force of the wind, and means whereby said controller device is adapted to automatically effect the alternate operation of said devices during the operation of said windwheel.

51. The combination in a windmill power plant of a windwheel comprising a sail portion which is adapted to active and inactive positions, speed regulating mechanism for said windwheel, a power utilizing machine placed at a distance from said windwheel, power transmitting mechanism by means of which said windwheel is adapted to cause the actuation of said power utilizing machine, a controller for said machine, a main controller device responsive to predetermined wind forces, means whereby the said predetermined wind forces will produce such movement of said main controller as will cause said sail portion to assume either active or inactive positions respectively, and means whereby other predetermined wind forces will cause such movement of said main controller as will cause said machine controller to effect either the actuation or nonactuation respectively of said power utilizing machine during the operation of said windwheel and speed regulating mechanism.

52. In combination a main frame or turntable mounted upon a tower and adapted to automatically operate about a vertical axis, a main controller device nonrotatable with respect to and carried by said turntable and adapted to respond to the variations in the force of the wind, a plurality of other controller devices mounted apart from said turntable, and means whereby said main controller device is adapted to automatically and alternately actuate said other controller devices during the operation of said turntable about said vertical axis.

53. The combination in a windmill power plant of a shaft adapted to be reciprocally actuated, a frame or cage adapted to reciprocate independent of or to carry said shaft with it, means for reciprocating said frame or cage, a pawl or shaft actuating part carried by said cage, a collar longitudinally fixed on said shaft and adapted to coact with said pawl in causing said shaft to reciprocate with said cage, automatic means for moving said pawl to either an actuating or a nonactuating position, and an elastic or yielding part connecting said pawl with said automatic means.

54. The combination in a windmill power plant of a tower, a main frame or turntable adapted to operate about a vertical axis at the top of said tower, a pivot portion for said turntable having a vertical aperture, a windwheel and controller mechanism carried by said turntable, means for transmitting power through said vertical aperture, a vertically arranged swivel carrying shaft extending through said vertical aperture and adapted to rotate or oscillate with said turntable, a vertically apertured swivel casting slidably mounted on said swivel carrying shaft and adapted to rotate and oscillate therewith, a pull-out cord for said windwheel secured to said swivel casting, and a controller cord secured at its upper end to, said controller mechanism and extending through the vertical aperture of the said swivel casting.

55. The combination in a windmill power plant of a tower, a turntable rotatably mounted at the upper portion of said tower, a windwheel carried by said turntable, a plurality of machines stationed independent of said turntable and adapted to be actuated by said windwheel, an individual controller for each of said machines, a main controller responsive to predetermined variations in the force of the wind and so mounted as to be actuated by substantially the same force of wind as impels said windwheel, an intermediate controller mechanism in operative connection with said individual controllers and adapted to be actuated by said main controller, and means mounted in operative relation to said controllers and machines whereby predetermined wind forces acting on said windwheel and main controller will automatically cause the operation of any one or any number of said machines respectively.

56. In combination a tower, a windwheel mounted at the upper portion of said tower, a power utilizing device at the lower portion of said tower, means whereby said power utilizing device may be actuated by said windwheel, means mounted adjacent to said windwheel for controlling both said wheel and device, and means whereby said controlling means in connection with predetermined wind forces may automatically cause said windwheel to be put either into service or out of service during actuating winds and said power utilizing device to be put either into or out of service during the operation of said windwheel.

57. In combination a main frame or turntable, a pivot portion by means of which said turntable is adapted to operate about a vertical axis, a windwheel carried by said turntable, governor mechanism for said windwheel, a plurality of power utilizing devices mounted independent of said turntable, means by which said windwheel is adapted to actuate said power utilizing devices during the operation of said turntable about said vertical axis, an individual controller for each of said power utilizing devices, a main controller for said governing mechanism carried by said turntable and adapted to be actuated by the force of the wind, and means whereby said main controller is adapted to actuate parts of each of said individual controllers.

58. In combination a windwheel, a plurality of power utilizing devices adapted to be actuated by said windwheel, a controller device responsive to variations in the force of the wind, having a fixed range of action and adapted upon its near approach to either limit of said range of action to hold said windwheel against rotation, a plurality of weights, means whereby said controller device is adapted to alternately raise and hold suspended said weights as it moves from one limit to the other of said fixed range of action, and means whereby each of said power utilizing devices will be put into or out of service as its respective one of said weights is raised or lowered by said controller device.

59. In combination a windwheel, governing mechanism for said windwheel, means whereby said windwheel is adapted to actuate a machine located at a distance therefrom, the said machine, a controller for said machine, a main controller adapted to act in accordance with the variations in the force of the wind, means whereby said main controller may automatically cause said windwheel and governing mechanism to stand inactive in the absence of either work or suitable wind force, and means whereby parts of said machine controller may be automatically operated by said main controller during the operation of said windwheel and governing mechanism.

60. In combination a shaft adapted to be reciprocally actuated longitudinally, a frame or cage adapted to reciprocate with or independent of said shaft, a shaft actuating part carried by said frame or cage, an oscillating collar longitudinally fixed upon said shaft, and automatic means for oscillating said collar whereby it is made to stand in either an actuating or a nonactuating position relative to said shaft actuating part.

61. The combination in a windmill power plant of a shaft adapted to be longitudinally reciprocated, a power transmitting part adapted to be reciprocated with or independent of said shaft, a shaft actuating part carried by said power transmitting part, an oscillating collar longitudinally fixed upon said shaft and adapted to coöperate with said shaft actuating part in causing the reciprocation of said shaft, and means for automatically causing the oscillation of said collar.

62. In combination a shaft adapted to be longitudinally reciprocated, a moving part adapted to reciprocate with or independent of said shaft, an automatically operated actuating part carried by said moving part, and an automatically operated coacting part substantially longitudinally fixed upon said shaft and adapted to an operative engagement with said actuating part for the purpose set forth.

63. In combination a windwheel, a power utilizing device, means whereby said windwheel may be caused to actuate said power utilizating device, a main controller, means whereby said main controller may automatically cause either the actuation or nonactuation of said device during the operation of said windwheel, a work or out-put controller, means whereby said work or output controller may automatically cause either the actuation or nonactuation of the said device during the operation of said windwheel independent of the action of said main controller, and means whereby the said work controller may automatically cause said windwheel to be put either into or out of service during the prevalence of operating wind forces.

64. In combination a windwheel, a plurality of power utilizing devices, means whereby said windwheel may be caused to actuate said devices, a main controller, means whereby said main controller may automatically cause either the actuation or nonactuation of any one or any number of said power utilizing devices during the operation of said windwheel, a work or output controller, means whereby the said work controller may automatically cause either the actuation or nonactuation of one or more of said devices during the operation of said windwheel independent of the action of the said main controller, and means whereby the said work controller may automatically cause said windwheel to be put either into or out of service during the prevalence of operating wind forces.

65. In combination a windwheel, a plurality of power utilizing devices, means whereby said windwheel may be caused to actuate said devices, a main controller, means whereby said main controller may automatically cause either the actuation or nonactuation of any one or any number of said power utilizing devices during the operation of said windwheel, a work or output controller, and means whereby the said work controller may automatically cause either the actuation or nonactuation of one or more of said devices during the operation of said windwheel independent of the action of said main controller.

66. In combination a tower, a main frame or turntable mounted to operate about a vertical axis at the top of said tower, a dependent shaft mounted to move about said vertical axis with said turntable, a plurality of swivel portions mounted to operate about said vertical axis with said dependent shaft, a windwheel and controller mechanism carried by said turntable, a plurality of controller cords extending from said swivel portions to said controller mechanism, and means in connection with said cords and swivel portions whereby said windwheel and controller mechanism may be practically manipulated during the operation of said turntable about said vertical axis.

67. In combination a windwheel comprising a sail portion which is adapted to be put into active and inactive positions with respect to the direction of the wind, a controller part having a fixed range of action, and means whereby said controller part may be caused at each limit of said range of action to automatically cause said sail portion to be held in its inactive position during the prevalence of predetermined wind forces.

68. In combination a tower, a main frame or turntable provided with a pivot portion by means of which it is adapted to operate about a vertical axis at the top of said tower, a windwheel and a controller device carried by said turntable, a plurality of power utilizing devices stationed at a distance from said turntable, a plurality of controller cords in operative connection with said controller device and said power utilizing devices, and means for the practical nonentangling operation of said controller cords during the operation of said windwheel, turntable and power utilizing devices.

69. The combination in a windmill power plant of a wind wheel, mechanism of a varying work or out-put capacity, means adapting said mechanism to be operated from its minimum to its maximum capacity by said windwheel, a main controller responsive to predetermined wind forces and adapted to move through a definite range of action, means whereby said main controller when at either of the extreme limits of said range of action will automatically cause said windwheel to be held out of action, work controlling mechanism, and means whereby the said main controller will automatically cause the operation of said work controlling mechanism in accordance with the respective wind forces as the said main controller is caused to operate between the said extreme limits of its range of action.

70. In a windmill power plant, in combination a windwheel, power utilizing mechanism adapted to be actuated by the said windwheel, and an automatic controller device responsive to predetermined variations in the force of the wind having a fixed range of movement and adapted while at the extremes of the said range of movement to hold the said windwheel inactive and while occupying intermediate positions between the said extremes to cause the respective parts of the said power utilizing mechanism to be actuated by the said windwheel.

71. The combination in a windmill power plant of a windwheel, a speed regulator and power controller mounted in connection with said windwheel, a main controller so mounted that it may operate independent of the said windwheel, a plurality of power utilizing devices adapted to be actuated by said windwheel, an individual controller part for each of said power utilizing devices, an intermediate controller mechanism in operative connection with said main controller and all of said individual controllers, and a work or out-put controller for each of the said power utilizing devices which are adapted to control the operation or out-put of their respective devices independent of the movements of the said main and intermediate controllers.

In testimony whereof I have signed my name to this specification in the presence of two subscribing witnesses.

WILLIAM P. BRETT.

Witnesses:

W. R. Funk,

Stacia Raupp.